(12) United States Patent
Kubo et al.

(10) Patent No.: US 7,147,250 B2
(45) Date of Patent: Dec. 12, 2006

(54) COUNTER WEIGHT

(75) Inventors: Kazuhiro Kubo, Hirakata (JP); Masatoshi Kajiya, Hirakata (JP); Morihiko Kawahashi, Hirakata (JP)

(73) Assignee: Komatsu Ltd., Tokyo (JP)

( * ) Notice: Subject to any disclaimer, the term of this patent is extended or adjusted under 35 U.S.C. 154(b) by 157 days.

(21) Appl. No.: 10/769,983

(22) Filed: Feb. 3, 2004

(65) Prior Publication Data

US 2005/0012314 A1 Jan. 20, 2005

(30) Foreign Application Priority Data

Feb. 4, 2003 (JP) ............................. 2003-027428

(51) Int. Cl.
*B60R 21/00* (2006.01)

(52) U.S. Cl. ..................................... 280/755

(58) Field of Classification Search ................ 280/755, 280/757, 759
See application file for complete search history.

(56) References Cited

FOREIGN PATENT DOCUMENTS

| JP | 8-199630 | 8/1996 |
| JP | 2000-63082 | 2/2000 |
| JP | 2000-225458 | 8/2000 |
| JP | 2000-302376 | 10/2000 |

*Primary Examiner*—Faye M. Fleming
(74) *Attorney, Agent, or Firm*—Armstrong, Kratz, Quintos, Hanson & Brooks, LLP

(57) ABSTRACT

To provide a counter weight capable of forming an attaching part to a vehicle frame with high precision, capable of improving attaching precision to this vehicle frame, and further, capable of decreasing a manufacture cost thereof. The counter weight includes a base made of cast iron having an attaching part, whereby the counter weight is attached to a vehicle frame; and a weight part made of a slab material having a block body made of a slab material; wherein the weight part made of the slab material is attached on the above-described base made of cast iron. The outer surface of the above-described weight part made of the slab material is coated with the cover. In addition, the connection plate is attached to the above-described base made of cast iron, the lower end edge of the above-described cover is joined to the base made of cast iron through the above-described connection plate, and the upper end edge of the above-described cover is joined to the upper part of the above-described weight part made of the slab material. Since the base made of cast iron is attached to the vehicle frame, it is possible to form the attaching part to the vehicle frame at a low cost, simply, and with high precession.

2 Claims, 10 Drawing Sheets

(a)

(b)

(c)

(a)

(b)

(c)

COUNTER WEIGHT

BACKGROUND OF THE INVENTION

1. Field of the Invention

The present invention relates to a counter weight to be used for a construction machine or the like.

2. Description of the Related Art

A construction machine such as a hydraulic shovel or the like is generally used for a counter weight. In other words, as shown in FIG. 8, a hydraulic shovel is provided with a lower traveling body 51, and an upper pivoting body 52 to be pivotably fitted in this lower traveling body 51 via a pivoting mechanism; and a counter weight 53 is arranged at a rear part of this upper pivoting body. In addition, an operating machine 54 is connected to the upper pivoting body 52. This operating machine 54 is provided with a boom 55, of which base is swingably coupled with the upper pivoting body 52; an arm 56 that is swingably coupled with a front end of this boom 55; and a bucket 57 that is swingably coupled with a front end of this arm 56.

Then, as this counter weight 53, a chassis made of a copper sheet housing many have-weight objects (for example, see a patent document 1), a framework made of plural blocks covering this framework with an outer surface (for example, see a patent document 2), and further, an object having a lower counter weight having an iron sheet accumulated therein, a middle counter weight having the iron sheet accumulated therein, and a lower counter having the iron sheet accumulated therein (for example, see a patent document 3) are available.

The counter weight described in the above-described patent document 1, as shown in FIG. 9, has a chassis 60 made of a copper sheet and plural heavy-weight objects 61 . . . contained in the chassis 60. In this case, the chassis 60 comprises a bottom plate 60a, an upper plate 60b, a front plate 60c, and a rear plate 60d; and a hollow chamber containing the heavy-weight objects (block) 61 therein is formed, and this hollow chamber is filled up. In addition, with the plural heavy-weight objects 61 . . . accumulated, a bolt member 62 to be inserted through the upper and lower heavy-weight objects 61 is screwed to the bottom plate 60a, and thereby, the counter weight is fixed within this chassis 60.

In addition, in the counter weight described in the patent document 2, as shown in FIG. 10, a plurality of blocks 63 is accumulated vertically to form a framework 64, and the outer surface of this framework 64 is coated with a cover 65. Then, by means of welding or the like, respective blocks 63 are joined, and the framework 64 is joined with the cover 65. In addition, the counter weight described in the patent document 3 is configured by the middle counter weight and the upper counter weight and as same as the above-described patent document 2, the plural blocks are vertically accumulated so as to form the framework, and this framework is coated with the cover. As the block 63 for the counter weight described in the patent document 2, for example, a slab material is used. There is a conventional example using a rejected slab material as the heavy-weight object of the counterweight (for example, see a patent document 4).

[A Patent Document 1]
JP-A-8-199630 (pp. 3–4, FIG. 1)

[A Patent Document 2]
JP-A-2000-302376 (pp. 4–5, FIG. 1)

[A Patent Document 3]
JP-A-2000-63082 (pp. 2–3, FIG. 1, FIG. 2)

[A Patent Document 4]
JP-A-2000-225458 (pp. 4–5, FIG. 7)

By the way, the counter weight of the construction machine is attached to a vehicle frame by fitting a counter weight attaching part of this vehicle frame with a lower face of the counter weight. Therefore, for this fitting, a concavoconvex part is provided at the lower face of the counter weight so as to form a fitting part. Thus, as shown in the above-described FIG. 9, if the bottom plate 60a of the chassis 60 is made of a flat plate, the concavity and convexity are formed in response to this concavoconvex part, so that the counter weight cannot house the heavy-weight object 61 stably. Further, a machine room having an engine or the like housed therein is formed in the upper pivoting body of the construction machine and a rear opening of this machine room is filled up with the counter weight. Thus, it is the often the case that the. concavoconvex part is formed for an engine and a piping to be connected to the engine in the inside of the counter weight (a face corresponding to the machine room) Even in such a case, it is difficult to form the concavoconvex part in the counter weight shown in the above-described FIG. 9. In other words, it is necessary to form respective heavy-weight objects 61 into intricate shapes in accordance with the shape of the chassis 60, and this makes it difficult to manufacture the counter weight and makes the manufacturing cost thereof higher.

In addition, according to the counter weight shown in the above-described FIG. 10, the heavy-weight object of the framework is attached to the vehicle frame. Therefore, it is necessary to make the lower face shape of this the lowest heavy-weight object into the shape in accordance with the counter weight attaching part of this vehicle frame. However, since this heavy-weight object is configured by a slab material, it is necessary to machine this slab material by cutting and it is difficult to cut the slab material into the shape in accordance with the counter weight attaching part with a high precision. In other words, if the heavy-weight object is configured by the slab material as this counter weight shown in FIG. 10, and that described in the above-described patent document 4, the shape of the heavy-weight object (block) becomes intricate, and this results in decreasing of yield of cutting and in making welding of respective heavy-weight objects complicated. Therefore, as same as the above-described counter weight shown in FIG. 9, the manufacturing cost of the counter weight becomes high.

Thus, according to the counter weight described in the patent document 2, it is difficult to form the attaching part to the vehicle frame with high precision, and depending on a degree of alignment to the shape of the counter weight attaching part at the vehicle frame side, it is feared that misalignment and a slope or the like are generated in an external design of the built counter weight and a commercial value thereof is lowered.

In addition, according to the counter weight described in the patent document 3, in the upper counter weight and the middle counterweight, a plurality of iron plates is accumulated, respectively, so that its manufacturing cost is high. Further, this counter weight has the upper and middle counter weights, and this result in complicated manufacture of the counter weight.

SUMMARY OF THE INVENTION

The present invention has been made taking the foregoing problems into consideration and an object of which is to provide a counter weight capable of forming an attaching part to a vehicle frame with high precision, capable of improving attaching precision to this vehicle frame, and further, capable of decreasing a manufacture cost thereof.

Therefore, the counter weight according to claim 1 may comprise a base 1 made of cast iron having an attaching part, whereby the counter weight is attached to a vehicle frame; and a weight part 2 made of a slab material having a block body made of a slab material; wherein the weight part 2 made of the slab material is attached on the above-described base 1 made of cast iron.

In the above-described counter weight according to claim 1, since the base 1 made of cast iron is attached to the vehicle frame, it is possible to form the attaching part to the vehicle frame at a low cost, simply, and with high precession differently from the conventional case that the counter weight is made of the slab material by cutting. Thereby, misalignment and a slope or the like are hardly generated in the external design of the built counter weight. In addition, since only a part attached to the vehicle frame as the heavy-weight object is made of cast iron and the other part is mainly made of the slab material, it is possible to achieve low cost entirely.

In the counter weight according to claim 2, the outer surface of the above-described weight part 2 made of the slab material is coated with the cover 30.

In the above-described counter weight according to claim 2, since the outer surface of the slab material made weight part 2 is coated with the cover 30, quality of the external design can be improved. In addition, the block body of the slab material made weight part 2 does not expose outside by coating the outer surface thereof with the cover 30. Therefore, precision in cutting the block body is not required so much, and this leads to the fact that cutting machine and assembly work become easy.

In the counter weight according to claim 3, the connection plate 7 is attached to the above-described base 1 made of cast iron, the lower end edge of the above-described cover 30 is joined to the base 1 made of cast iron through the above-described connection plate 7, and the upper end edge of the above-described cover 30 is joined to the upper part of the above-described weight part 2 made of the slab material.

In the counter weight according to claim 3, the lower end edge of the cover 30 is joined to the base 1 made of cast iron via the above-described connecting plate 7, so that it is possible to join this cover 30 and the base 1 made of cast iron certainly. In other words, although welding of the cast iron is generally difficult, it is possible to join this cover 30 and the base 1 made of cast iron certainly by welding the cover 30 to the connection plate 7 that is attached to the base 1 made of cast iron. In addition, since the slab material can be easily welded in the case that the upper end edge of the cover 30 is joined to the upper part of the above-described weight part 2, it is possible to join the weight part 2 made of the slab material to the cover 30 easily. Thus, it is possible to certainly join the cover 30 coating the outer surface of the weight part 2 made of the slab material to the base 1 even when the base 1 is made of cast iron, and this results in stable fitting of the cover 30.

In the counter weight according to claim 4, the outer surface of this weight part 2 made of the slab material is configured by the plate member 26 made of a copper plate or the like.

The above-described counter weight according to claim 4 may cut the slab material in the event of forming the weight part 2 made of the slab material, and it is difficult to finish the outer surface thereof with high precision. Therefore, by bending the plate member 26 made of a copper sheet or the like, the outer surface of the weight part 2 made of the slab material is composed of this plate member 26. Thereby, it is possible to form the outer surface of the weight part 2 made of the slab material into a shape corresponding to the cover 30 with high precision. As a result, the plate member 26 is arranged in the inside of the cover 30, and this makes it possible to decrease modification of the cover 30 even if a large load is given to the cover 30 from the outside and strength of the cover 30 is improved. In addition, since the weight of the plate member 26 is added to the weight of the counter weight, the stable work becomes possible. Further, it is possible to acquire an advantage such that the cover 30 can be easily fit.

As claim 5, the above-described weight part 2 made of the slab material may be configured in such a manner that the block bodies of the slab material are accumulated vertically, or as claim 6, the block bodies made of the slab material are arranged in a lateral direction.

BRIEF DESCRIPTION OF THE DRAWINGS

FIG. 3(*a*) is a perspective view seen from the upper part of the counter weight, and FIG. 3(*b*) is a perspective view seen from the lower part thereof;

DESCRIPTION OF THE PREFERRED EMBODIMENTS

Figure 1:
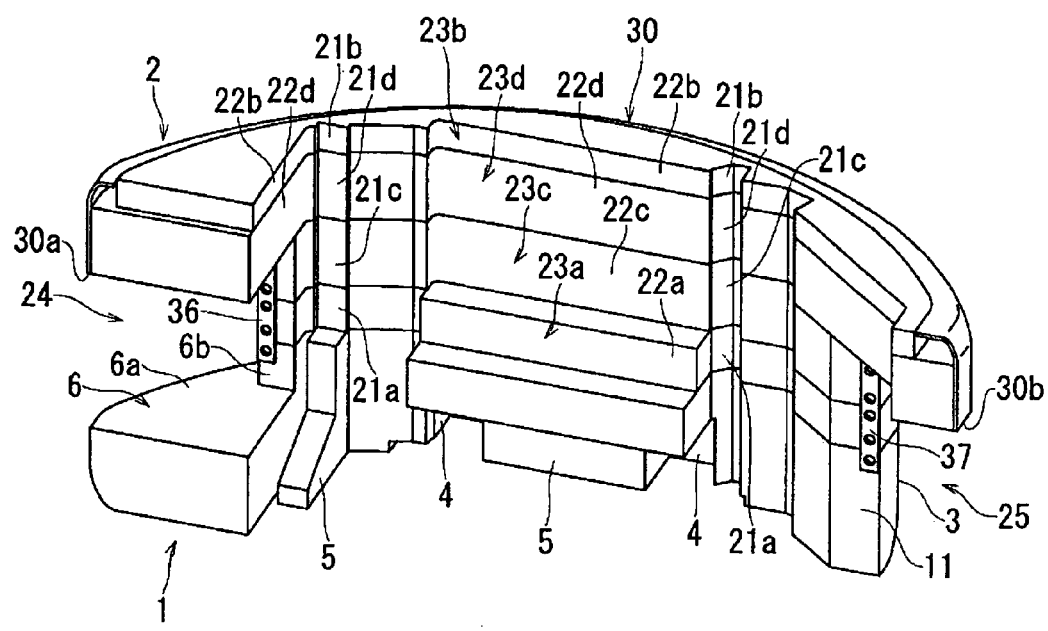
FIG. 1 is a perspective view seen from the inside of a counter weight showing an embodiment of the counter weight according to the present invention.
Figure 2:
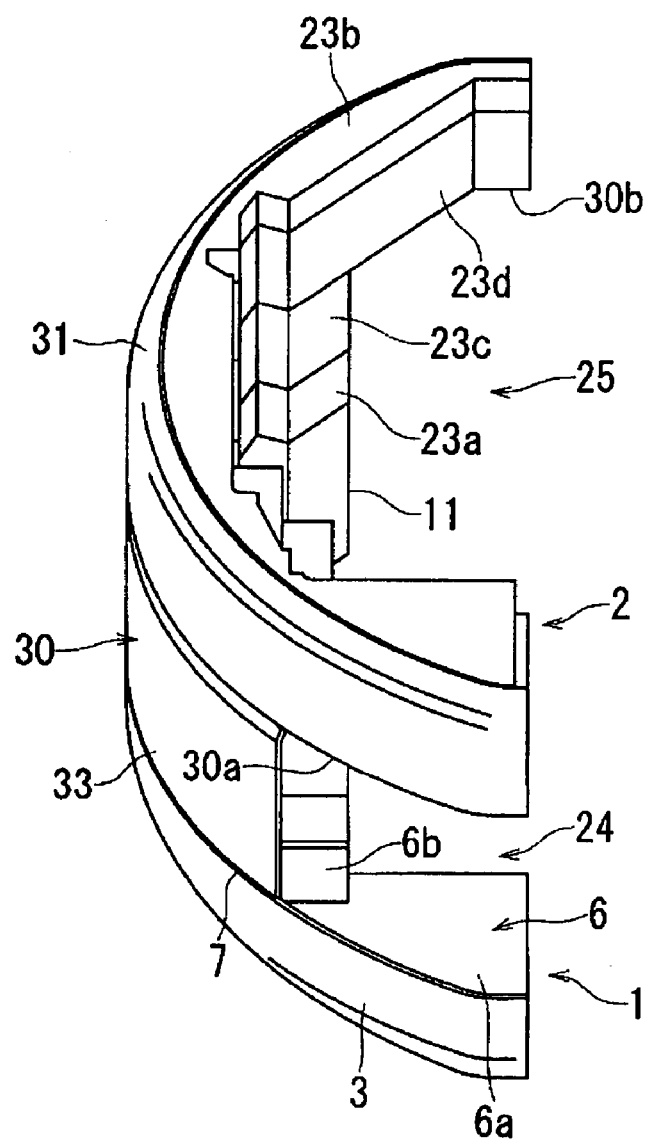
FIG. 2 is a perspective view seen from the outside of the above-described counter weight.

With reference to the drawings, embodiments according to the counter weight of the present invention will be described in detail below. FIG. 1 is a perspective view seen from the inside of a counter weight, and FIG. 2 is a perspective view seen from the outside of the above-described counter weight. This counter weight have a base 1 made of cast iron and a weight part 2 made of a slab material that is mounted on this base 1 made of cast iron and this counter weight is used for, for example, a construction machine such as a hydraulic shovel or the like.

Figure 3:
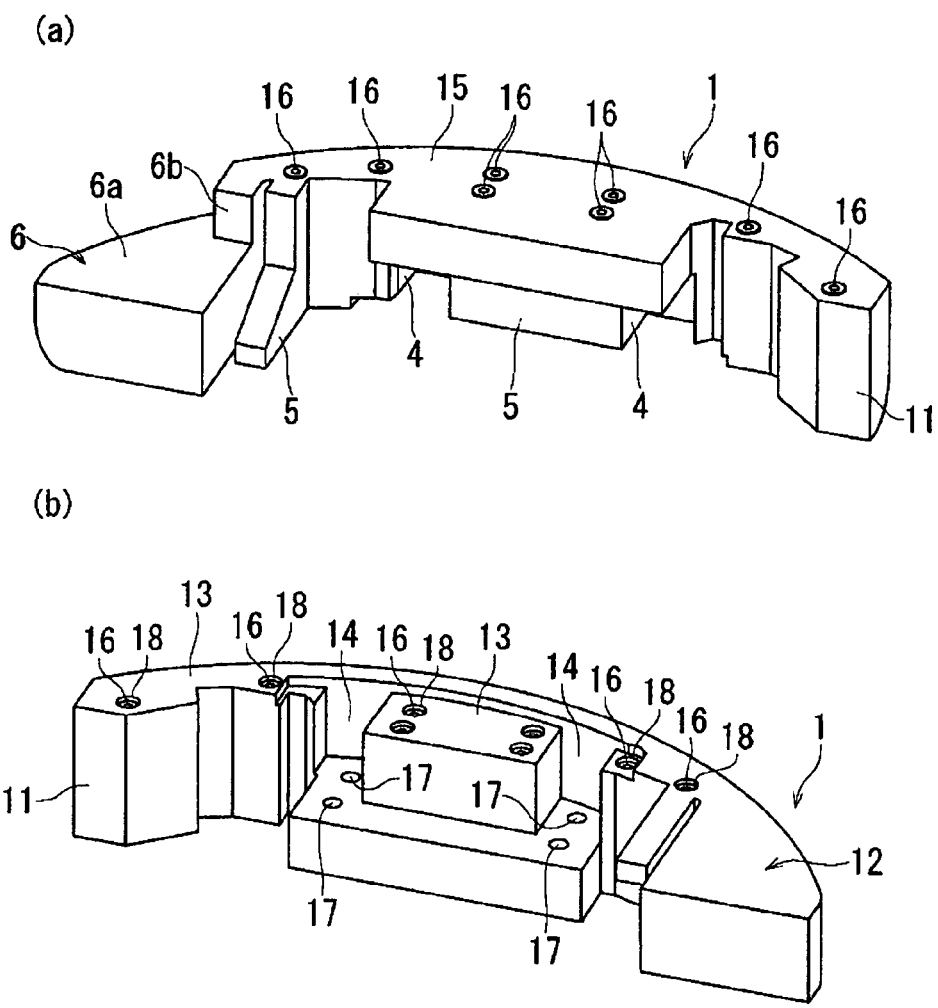
FIG. 3 shows a bas made of cast iron of the above-described counter weight.
Figure 5:
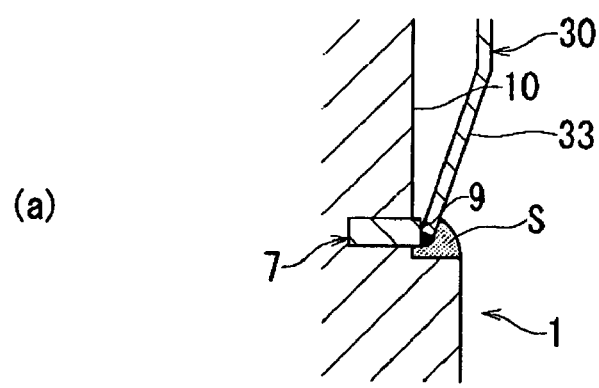
FIG. 5 shows joining condition of a cover of the above-described counter weight and a connection plate, FIG. 5(*a*) is an enlarged sectional view, FIG. 5(*b*) is an enlarged sectional view of other joining condition, and FIG. 5(*c*) is an enlarge sectional view of still other joining condition.
Figure 5:
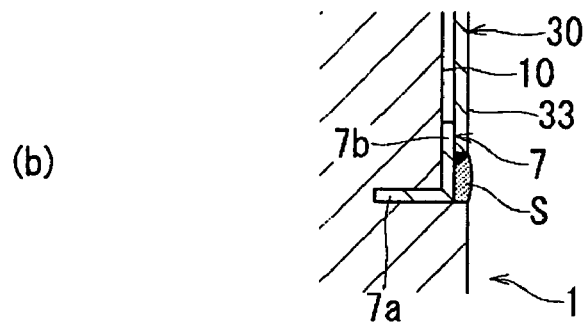
Figure 5:
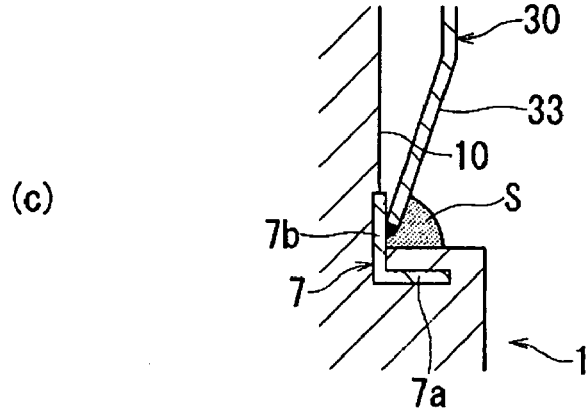
Figure 6:
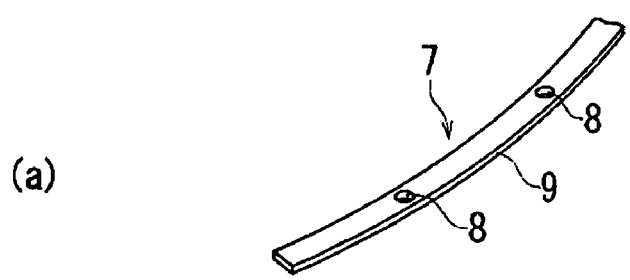
FIG. 6 shows a connection plate of the above-described counter weight, FIG. 6(*a*) is a perspective view, FIG. 6(*b*) is a perspective view of other connection plate, and FIG. 6(*c*) is a perspective view of still other connection plate.
Figure 6:
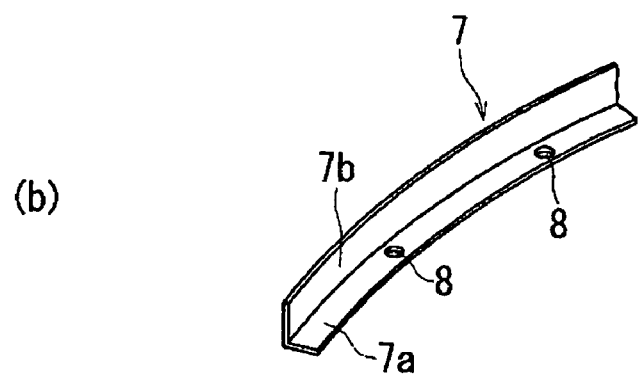
Figure 6:
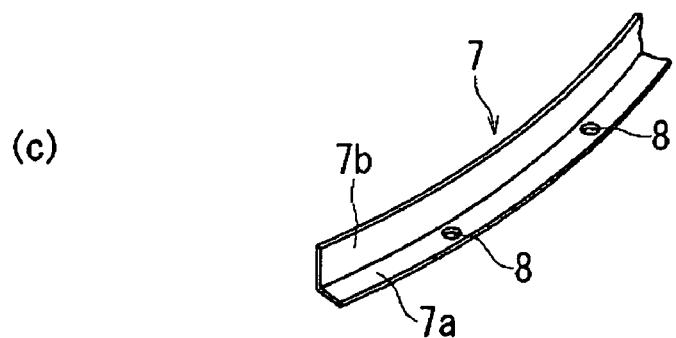

As shown in FIGS. 1 to 3, an outer surface 3 of the base 1 made of cast iron is a circle shape, the base 1 made of cast iron is composed of a circle block in which a concave portion 4 and a convex portion 5 are formed, and a crena portion 6 is formed at the upper part of one end side thereof. In addition, for example, this base 1 made of cast iron is provided with a connection plate 7. The connection plate 7 is made of steel such as a soft steel or the like, and as shown in FIG. 4, FIG. 5(a), and FIG. 6(a), the connection plate 7 is made of a circular band plate body and through holes 8 are formed at a predetermined pitch.

Figure 4:
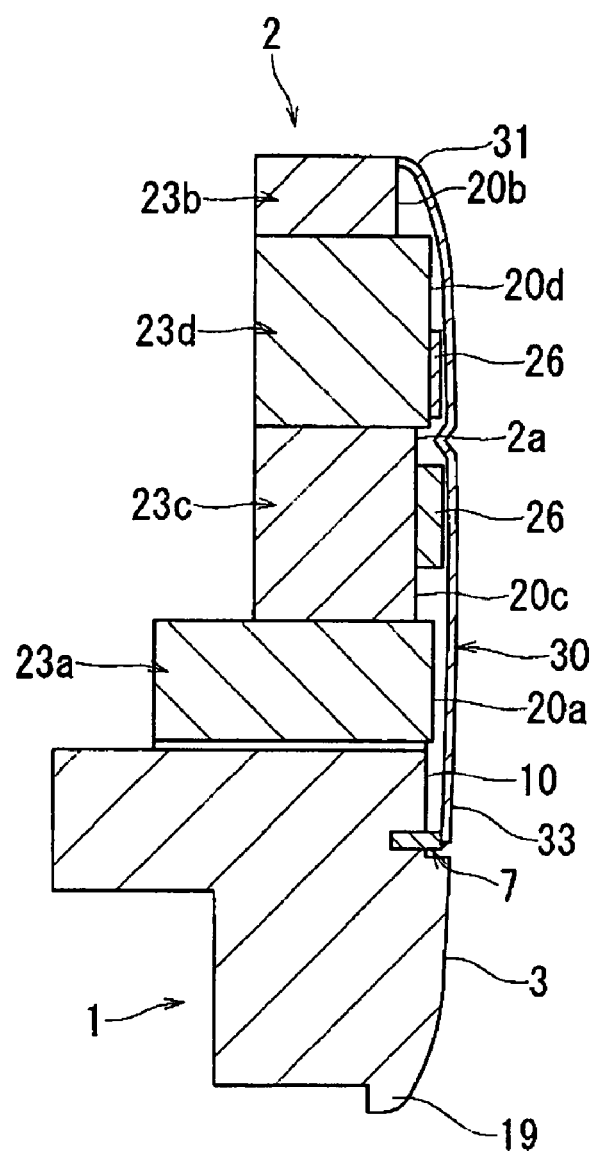
FIG. 4 is a sectional view of the above-described counter weight.

In this case, as shown in FIG. 4, a concave portion 10 is provided on the outer surface 3 of the base 1 made of cast iron, and at the lower side of this concave portion 10, the above-described connection plate 7 is arranged. In other words, as shown in FIG. 2, the lower end edge of the concave portion 10 is set at the same height as a horizontal crena face 6a of the crena portion 6, and from a vertical crena face 6b of the crena portion 6, the concave portion 10 is formed across an end edge of an opposite crena portion side. Then, as shown in FIG. 5(a), the connection plate 7 is embedded in the base 1 made of cast iron so that an outer end edge 9 thereof is exposed from this base 1 made of cast iron to the outside at the lower side of the concave portion 10. In this case, since this base 1 is made of cast iron, upon casting this base 1, the connection plate 7 is attached to the base 1 made of cast iron by casting the base 1 made of cast iron so that the outer end edge 9 of the connection plate 7 is exposed to the outside.

In addition, as shown in FIG. 3(b), on a lower face 12 of the base 1 made of cast iron, a flat surface 13 and a concave portion 14 or the like as the attaching part to the vehicle frame are formed. Then, as shown in FIG. 3(a), the flat surface 13 is provided with through holes 16 opening to an upper face 15, on which the weight part 2 made of the slab material is mounted. These through holes 16 serve to attach this weight part 2 made of the slab material to this base 1 made of cast iron. Further, screw holes 17 are provided on the concave portion 14 at the side of the lower face 12, whereby this base part 1 made of cast iron is attached to the vehicle frame. In other words, the base part 1 made of cast iron is attached to the vehicle frame in such a manner that a counter weight attaching part of the vehicle frame is fit into this concave portion 14 and a bolt member is screwed into this screw hole 17 from the lower part though the counter weight attaching part. Further, a counter boring 18 is formed at the opening of the lower side of the above-described through hole 16. In addition, as shown in FIG. 4, a dropping part 19 is formed along an outer edge of the lower face 12 of the base 1 made of cast iron.

Next, as shown in FIGS. 1, 2, and 4 or the like, in the weight part 2 made of the slab material, a lower block body 23a, an upper block body 23b, and two middle block bodies 23c and 23d inserted between these lower block body 23a and upper block body 23b are vertically accumulated (namely, respective block bodies extending in a horizontal direction are accumulated vertically), and respective block bodies are formed by cutting the slab material. Outer surfaces 20a, 20b, 20c, and 20d of respective block bodies 23a, 23b, 23c, and 23d are made circular, and respective block bodies 23a, 23b, 23c, and 23d are made of circular blocks in which concave portions 21a, 21b, 21c, and 21d and convex portions 22a, 22b, 22c, and 22d formed in the inside thereof. In addition, the lengths (the arc length) of the upper block body 23b and the middle block body 23d are set longer than the length of the base 1 made of cast iron (the arc length), and the lengths (the arc length) of the lower block body 23a and the middle block body 23c are set shorter than the length of the base 1 made of cast iron. Therefore, in the upper block body 23b and the middle block body 23d, its one end faces upward to the horizontal crena face 6a of the crena portion 6 of the base 1 made of cast iron, and its other end projects from the opposite crena portion of the base 1 made of cast iron. In addition, in the lower block body 23a and the middle block body 23c, its one end corresponds to the vertical crena face 6b of the crena portion 6, and its other end corresponds to the opposite crena portion of the base 1 made of cast iron. As a result, windows 24 and 25 are formed on this counter weight.

By the way, respective block bodies 23a, 23b, 23c, and 23d are joined into one body by welding. In addition, a screw hole (not illustrated) is provided on the lower block body 23a, and under the condition that this joined and united block bodies 23a, 23b, 23c, and 23d are mounted on the upper surface 15 of the base 1 made of cast iron, a bolt member (not illustrated) to be inserted into the through holes 16 of this base 1 is screwed in the screw hole of this lower block body 23a from the lower part of this base 1. Thereby, it is possible to fasten this base 1 made of cast iron and the lower block body 23a, namely, the weight part 2 made of the slab material.

Since the above-described respective block bodies 23a, 23b, 23c, and 23d are formed by cutting the slab member, it is not possible to form their outer surfaces 20a, 20b, 20c, and 20d with high precision. Therefore, as shown in FIG. 4, the plate member 26 made of a copper sheet or the like is bended and molded on the outer surfaces 20a, 20b, 20c, and 20d of respective block bodies 23a, 23b, 23c, and 23d (in the drawing, the outer surfaces 20c, 20d), and then, by fitting this plate member 26 (for example, welding), the outer surface 2a of the weight part 2 made of the slab material is configured by the outer face of this plate amber 26. Thereby, it is possible to form a curvature radius substantially same as the radius of the inner face of the cover 30 (to be described later).

Thus, if the base 1 made of cast iron is fastened with the weight part 2 made of the slab material, the cover 30 is arranged to cover the outer surface 2a of this weight part 2 made of the slab material. As shown in FIG. 2 and FIG. 4, the cover 30 is made of a curved plate along the outer surface 2a of this weight part 2 made of the slab material, and its upper end edge 31 is curved inside. In this case, in accordance with the above-described windows 24 and 25, this cover 30 is provided with crenas 30a. Further, this cover 30 can be made of a copper plate or the like.

In the above-described cover 30, its upper end portion 31 is curved to the side of the weight part 2 made of the slab material so as to be joined to the upper part of a main body of this counter weight part 2, namely, the upper part of the upper block body 23b, and at the same time, its lower end edge 33 is joined to the outer end edge 9 exposed to the outside of the above-described connection plate 7 (see FIG. 5(a)). Then, as shown in FIG. 5(a), in the joint portion to the upper block body 23b, in the joint portion to the connection plate 7, and in the vicinity thereof, a seal member S such as a caulking material and a putty or the like is injected. Thereby, rain water is kept from entering from the outside to the inside. In addition, the band plate body shown in FIG. 6(a) is used in FIG. 5(a) as the connection plate 7, however, as shown in FIG. 6(b), (c), the connection plate 7 may be configured by a L-shaped section made of a horizontal part 7a having the through hole 8 and a vertical part 7b. In the event of using the connection plate 7 shown in FIG. 6(b), as shown in FIG. 5(b), the horizontal part 7a is arranged facing inwardly to be embedded in the base 1 made of cast iron. In addition, in the event of using the connection plate 7 shown in FIG. 6(c), as shown in FIG. 5(c), the horizontal part 7a is arranged facing outwardly to be embedded in the base 1 made of cast iron. Then, the lower end edge 33 of the cover 30 is joined to the vertical part 7b exposed to the outside by welding. In this case, the seal member S is also injected in a gap at the outside of the lower end edge 33.

In addition, the above-described windows 24 and 25 are filled up with a lid member (not illustrated). In this case, the lid member is fit with this counter weight swingably via hinge, so that attaching plates 36 and 37 are arranged to respective windows 24 and 25 so as to attach the hinge as shown in FIG. 1. Thereby, the outer face 2a of the weight part 2 made of the slab material is surrounded by the cover 30 and the lid member, and this results in forming the counter weight. In addition, on the inner face of this counter weight, the concavoconvex part for the engine and the piping connected to the engine or the like is formed by the concave portion 4 and the convex portion 5 at the inner face of the base 1; and a concave portion 21 and a convex portion 22 at the inner face of the main body 2.

According to the above-described counter weight, since the base 1 made of cast iron is attached to the vehicle frame, it is possible to form the attaching part to the vehicle frame with high precision. Thereby, the precision of attaching to the vehicle frame is improved, and misalignment and a slope or the like are hardly generated in the external design of the built counter weight. In addition, since only a part attached to the vehicle frame as the heavy-weight object is made of cast iron and the other part is mainly made of the slab material, it is possible to achieve low cost entirely.

In addition, since the outer surface 2a of the slab material made weight part 2 is coated with the cover 30, quality of the external design can be improved. Further, by coating the outer surface 2a with the cover 30, the lower block body 23a, the upper block body 23b, and two middle block bodies 23c and 23d, which are made of a slab material, are not exposed to the outside; and it is not necessary to form the outer shape of these block bodies 23a, 23b, 23c, and 23d. This makes the cutting machine when forming respective block bodies 23a, 23b, 23c, and 23d simple.

The lower end edge of the cover 30 is joined to the base 1 made of cast iron via the above-described connecting plate 7, so that it is possible to join this cover 30 and the base 1 made of cast iron certainly. In addition, since the slab material can be easily welded in the case that the upper end edge of the cover 30 is joined to the upper part of the above-described weight part 2, it is possible to join the weight part 2 made of the slab material to the cover 30 easily. Thus, it is possible to certainly join the cover 30 coating the outer surface 2a of the weight part 2 made of the slab material to the base 1 made of cast iron, and this results in stable fitting of the cover 30.

It is possible to form the outer surface 2a of the weight part 2 made of the slab material into a shape corresponding to the cover 30 with high precision by the plate member 26 made of a copper plate or the like. As a result, the plate member 26 is arranged in the inside of the cover 30, and this makes it possible to decrease modification of the cover 30 even if a large load is given to the cover 30 from the outside and strength of the cover 30 is improved. In addition, since the weight of the plate member 26 is added to the weight of the counter weight, the stable work can be obtained. Further, it is possible to acquire an advantage such that the cover 30 can be easily fit. In addition, precision in cutting the block bodies 23a, 23b, 23c, and 23d is not required so much, so that cutting machine when forming respective block bodies 23a, 23b, 23c, and 23d is simple.

Figure 7:
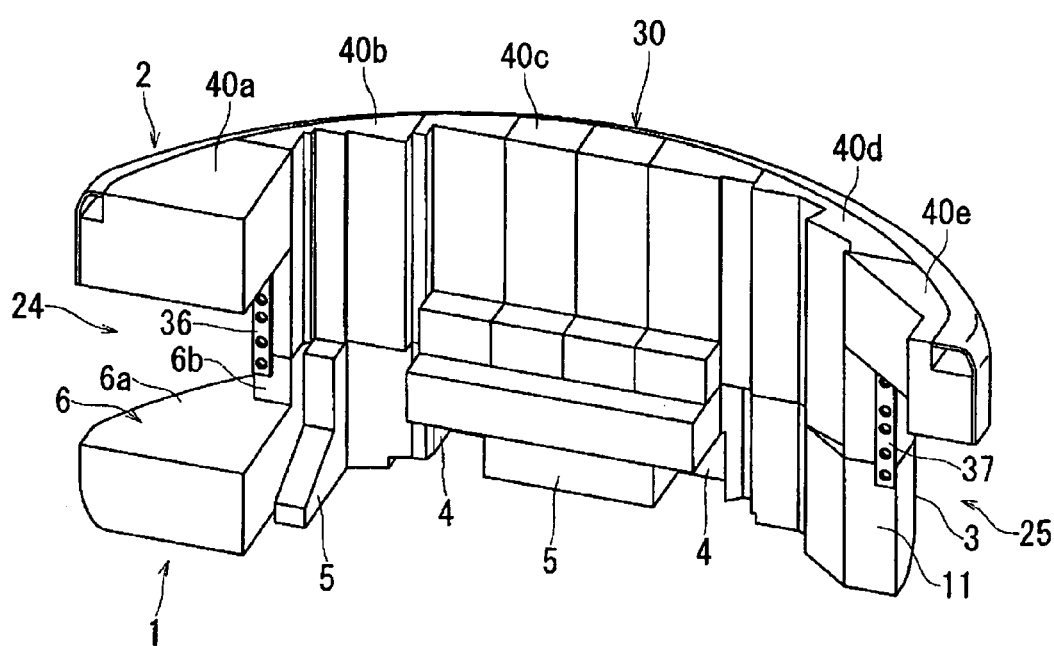
FIG. 7 is a perspective view showing other embodiment of the counter weight of the present invention.
Figure 8:
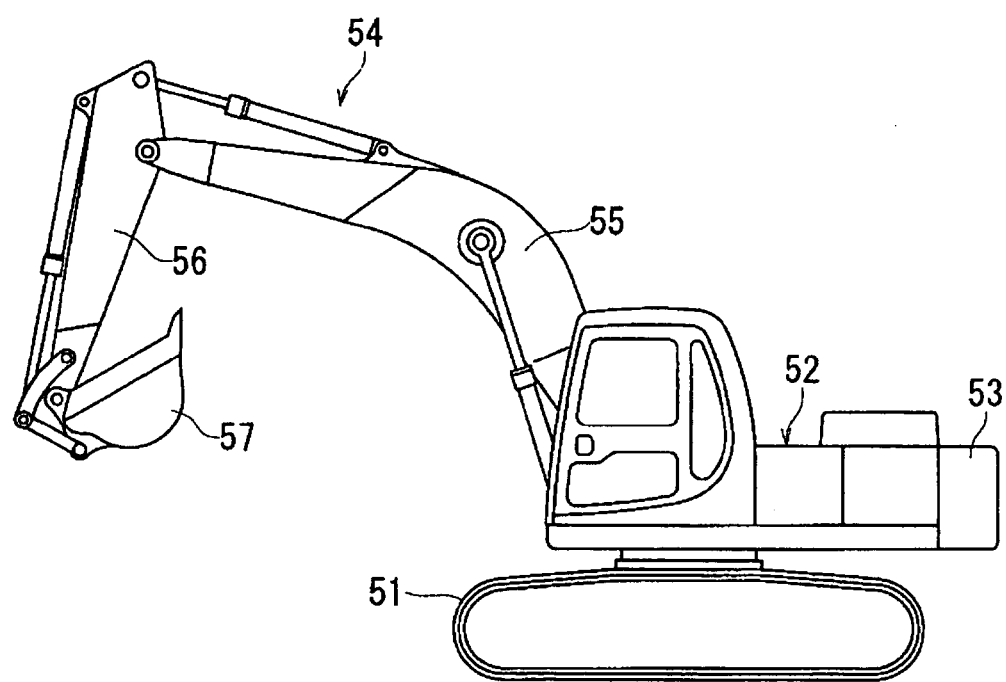
FIG. 8 is an entire side view of a construction machine.
Figure 9:
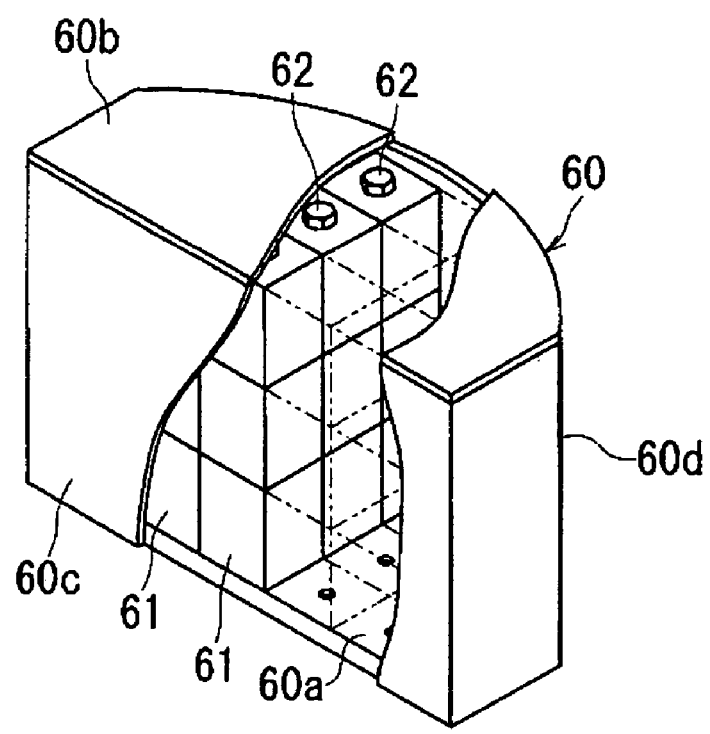
FIG. 9 is a perspective view of a conventional counter weight.
Figure 10:
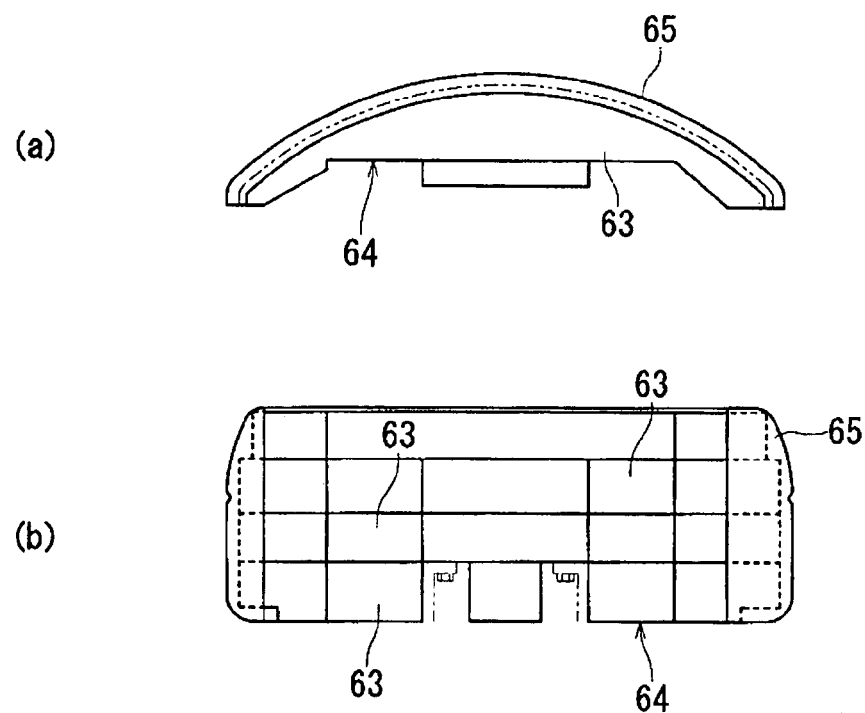
FIG. 10 shows conventional other counter weigh, FIG. 10(*a*) is a plain view, and FIG. 10(*b*) is a front view.

Next, FIG. 7 shows other embodiment. In this case, the weight part 2 made of the slab material is configured by a plurality of block bodies 40a, 40b, 30c, and 30d arranged along a vertical direction (a lateral direction), namely, it is configured by accumulating respective block bodies extending in the vertical direction in the lateral direction. In this case, since the lower base 1 made of cast iron is identical with the above-described base 1 shown in FIG. 1, its explanation is herein omitted. In addition, adjoining block bodies 40a and 40b or the like are joined into one body by welding, and a screw hole is provided on the lower face of the weight part 2 made of the slab material. In other words, under the condition that the weight part 2 made of the slab material is mounted on the upper surface 15 of the base 1 made of cast iron, a bolt member (not illustrated) to be inserted into the through holes 16 of this base 1 is screwed in the screw hole of the lower face of the weight part 2 made of the slab material from the lower part of this base 1. Thereby, it is possible to fasten this base 1 made of cast iron and the weight part 2 made of the slab material.

Then, also in this case, the outer surface 2a of this weight part 2 made of the slab material is coated with the cover 30, and at the same time, the outer surface 2a of this weight part 2 made of the slab material is configured by the plate member 26 made of an iron plate or the like. Further, the windows 24 and 25 are formed, which are filled up with the lid member. Further, in the inner face of the counter weight, the concavoconvex part for the engine and the piping or the like connected to the engine is formed.

Accordingly, as same as the above-described counter weight shown in FIG. 1, this counter weight shown in FIG. 7 also have an advantage such that the precision of attaching to the vehicle frame is improved, and misalignment and a slope or the like are hardly generated in the external design of the built counter weight.

Specific embodiments of the present invention are described above, however, the present invention is not limited to the above-described embodiments but various modification of the present invention can be effected within a scope of the present invention. For example, the number of the block bodies 23 and 40 composing the weight part 2 made of the slab material can be increased or decreased freely, and further, the shapes of respective block bodies 23 and 30 can be variously changed in accordance with the shape of a housed material (for example, an engine or the like) in the machine room in which this counter weight is used. Further, in the event of configuring the weight part 2 made of the slab material, the block bodies accumulated vertically and the block bodies arranged in the lateral direction may be combined. In addition, the connection plate 7 may be made of a material to which the cover 30 can be welded, and the connection plate 7 may be fit with the base 1 made of cast iron not only by cast packing, but also by the other means (for example, a bolt connection or the like). As a machine in which this counter weight is used, in addition to the hydraulic shovel, various construction machines such as a wheel loader and a bulldozer or the like are available and further, various farm machines needing the counter weight are also available.

What is claimed is:

1. A counter weight comprising:
a base made of cast iron having an attaching part, whereby the counter weight is attached to a vehicle frame; and a weight part made of a slab material, which is configured such that a plurality of block bodies made of a slab material are accumulated vertically and joined together, wherein said weight part made of the slab material is attached on said base made of cast iron, and the other surface of said weight part made of the slab material is coated with a cover, and wherein said weight part made of the slab material is configured such that shapes of said block bodies are variously changed in accordance with the shape of a housed material in a machine room.

2. A counter weight, comprising:

a base made of cast iron having an attaching part, whereby the counter weight is attached to a vehicle frame; and a weight part made of a slab material, which is configured such that a plurality of block bodies made of a slab material are accumulated vertically and joined together, wherein said weight part made of the slab material is attached on said base made of cast iron, and the other surface of said weight part made of the slab material is coated with a cover, and wherein a connection plate is attached to said base made of cast iron, the lower end edge of said cover is joined to said base made of cast iron through said connection plate, and the upper end edge of said cover is joined to the upper part of said weight part made of the slab material.

* * * * *